US009071856B2

(12) United States Patent
Bahnck

(10) Patent No.: US 9,071,856 B2
(45) Date of Patent: Jun. 30, 2015

(54) POLICY ENFORCEMENT FOR MULTIPLE DEVICES USING AN AUDIENCE DEFINITION

(75) Inventor: Thomas J. Bahnck, Lafayette Hill, PA (US)

(73) Assignee: ARRIS Technology, Inc., Suwanee, GA (US)

( * ) Notice: Subject to any disclaimer, the term of this patent is extended or adjusted under 35 U.S.C. 154(b) by 127 days.

(21) Appl. No.: 13/485,745

(22) Filed: May 31, 2012

(65) Prior Publication Data

US 2013/0326577 A1 Dec. 5, 2013

(51) Int. Cl.

| | |
|---|---|
| ***H04L 29/06*** | (2006.01) |
| ***H04N 21/254*** | (2011.01) |
| ***H04N 21/258*** | (2011.01) |
| ***H04N 21/266*** | (2011.01) |
| ***H04N 21/4627*** | (2011.01) |
| ***H04N 21/835*** | (2011.01) |
| *G06F 17/00* | (2006.01) |
| *G06F 11/00* | (2006.01) |
| *G06F 12/14* | (2006.01) |
| *G06F 12/16* | (2006.01) |

(52) U.S. Cl.

CPC ..... *H04N 21/2541* (2013.01); *H04N 21/25825* (2013.01); *H04N 21/25833* (2013.01); *H04N 21/266* (2013.01); *H04N 21/4627* (2013.01); *H04N 21/835* (2013.01)

(58) Field of Classification Search

None

See application file for complete search history.

(56) References Cited

U.S. PATENT DOCUMENTS

| | | | | |
|---|---|---|---|---|
| 6,880,081 | B1 * | 4/2005 | Itkis | 713/163 |
| 2004/0187014 | A1 * | 9/2004 | Molaro | 713/200 |
| 2005/0097595 | A1 * | 5/2005 | Lipsanen et al. | 725/25 |
| 2006/0015580 | A1 * | 1/2006 | Gabriel et al. | 709/219 |
| 2007/0199075 | A1 * | 8/2007 | Skoric et al. | 726/27 |
| 2008/0104713 | A1 * | 5/2008 | Jeon et al. | 726/30 |
| 2008/0134309 | A1 * | 6/2008 | Qin et al. | 726/6 |
| 2008/0279534 | A1 * | 11/2008 | Buttars | 386/94 |
| 2009/0328123 | A1 | 12/2009 | Alkove et al. | |
| 2012/0079512 | A1 | 3/2012 | Nambakkam et al. | |
| 2013/0124862 | A1 * | 5/2013 | Pestoni et al. | 713/168 |

FOREIGN PATENT DOCUMENTS

| | | | |
|---|---|---|---|
| EP | 1263233 | A2 | 12/2002 |
| WO | 02/086725 | A1 | 10/2002 |

OTHER PUBLICATIONS

PCT International Search Report & Written Opinion, Re: Application #PCT/US2013/043458, Aug. 12, 2013.

* cited by examiner

*Primary Examiner* — Shin-Hon Chen

(74) *Attorney, Agent, or Firm* — Thomas A. Ward

(57) ABSTRACT

In one embodiment, a method determines an audience rule to be applied for delivering content. The audience rule specifies an audience that is defined based on a combination of device properties, content properties, and digital rights management (DRM) properties. A device group associated with a group of devices is determined where devices in the device group are associated with content authorization properties, device properties, and digital rights management (DRM) properties. The method then applies the audience rule to the device group to determine any devices in the group of devices in which a content authorization for a device should be altered based on analyzing the content authorization properties, device properties, and digital rights management (DRM) properties of the device group and the combination of device properties, content properties, and digital rights management (DRM) properties of the audience rule.

7 Claims, 13 Drawing Sheets

```
<PolicyRules>                                            302
    <MaxDevicesInDG>S</MaxDevicesInDG>                   304
    <AudienceList>                                       306
      <Directive>                                        308
          <Allow>false</Allow>
  </Directive>
  <Audience id="600">
      <DevicePropertyRef id="300" />                     209-1
      <LinearAuth
          handle="100000" type="package" />
  </Audience>
  <Audience id="601">
      <DevicePropertyRef id="301" />
      <DevicePropertyRef id="400" />
      <LinearAuth
          handle="200000" type="service" />
      <LinearAuth
209       handle="200001" type="service" />
      <LinearAuth
          handle="200002" type="service" />
   </Audience>
   <Audience id="602">
          <DevicePropertyRef  id="500" />                209-2
          <DRMProviderRef id="PlayReady" />
  </Audience>
  <Audience id="603">
          <VODAuth
          assetid="500000" />
   </Audience>
  </AudienceList>
 </PolicyRules>
```

FIG. 3

POLICY ENFORCEMENT FOR MULTIPLE DEVICES USING AN AUDIENCE DEFINITION

BACKGROUND

Multiple system operators (MSOs) are now offering over-the-top (OTT) services that deliver video to various devices. For example, video can be delivered to smartphones, personal computers, laptops, and tablet devices. This is in addition to delivering the content traditionally through a cable network (or other networks) to a television. Content providers provide the content to the MSOs, which operate multiple systems. For example, the MSO may operate different systems that can provide content through the cable network and/or the Internet. The MSO may provide the OTT services through the Internet.

By providing over-the-top services, different devices may be used by users. For example, previously, set top boxes were used to receive and output the content on just televisions. However, when using over-the-top services, a disparate set of devices may be used by households. For example, one household may include a smartphone of a first type and another household may include a smartphone of a second type and also a tablet computer. This makes it hard to isolate and control any content restrictions requested by the content providers. For example, a content provider may want to restrict a TV show from being played on a certain type of device, such as a TV show should not be played on smartphones. The MSO cannot efficiently determine which households include that type of device and deauthorize the devices to play the content.

SUMMARY

In one embodiment, a method determines an audience rule to be applied for delivering content. The audience rule specifies an audience that is defined based on a combination of device properties, content properties, and digital rights management (DRM) properties. A device group associated with a group of devices is determined where devices in the device group are associated with content authorization properties, device properties, and digital rights management (DRM) properties. The method then applies the audience rule to the device group to determine any devices in the group of devices in which a content authorization for a device should be altered based on analyzing the content authorization properties, device properties, and digital rights management (DRM) properties of the device group and the combination of device properties, content properties, and digital rights management (DRM) properties of the audience rule.

In one embodiment, a non-transitory computer-readable storage medium is provided containing instructions, that when executed, control a computer system to be configured for: determining an audience rule to be applied for delivering content, wherein the audience rule specifies an audience that is defined based on a combination of device properties, content properties, and digital rights management (DRM) properties; determining a device group associated with a group of devices, wherein devices in the device group are associated with content authorization properties, device properties, and digital rights management (DRM) properties; and applying the audience rule to the device group to determine any devices in the group of devices in which a content authorization for a device should be altered based on analyzing the content authorization properties, device properties, and digital rights management (DRM) properties of the device group and the combination of device properties, content properties, and digital rights management (DRM) properties of the audience rule.

In one embodiment, An apparatus is provided comprising: one or more computer processors; and a computer-readable storage medium comprising instructions for controlling the one or more computer processors to be operable to: determining an audience rule to be applied for delivering content, wherein the audience rule specifies an audience that is defined based on a combination of device properties, content properties, and digital rights management (DRM) properties; determining a device group associated with a group of devices, wherein devices in the device group are associated with content authorization properties, device properties, and digital rights management (DRM) properties; and applying the audience rule to the device group to determine any devices in the group of devices in which a content authorization for a device should be altered based on analyzing the content authorization properties, device properties, and digital rights management (DRM) properties of the device group and the combination of device properties, content properties, and digital rights management (DRM) properties of the audience rule.

The following detailed description and accompanying drawings provide a more detailed understanding of the nature and advantages of particular embodiments.

BRIEF DESCRIPTION OF THE DRAWINGS

FIG. 3 depicts an example of software code for a policy rules set according to one embodiment.

DETAILED DESCRIPTION

Described herein are techniques for a content authorization system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
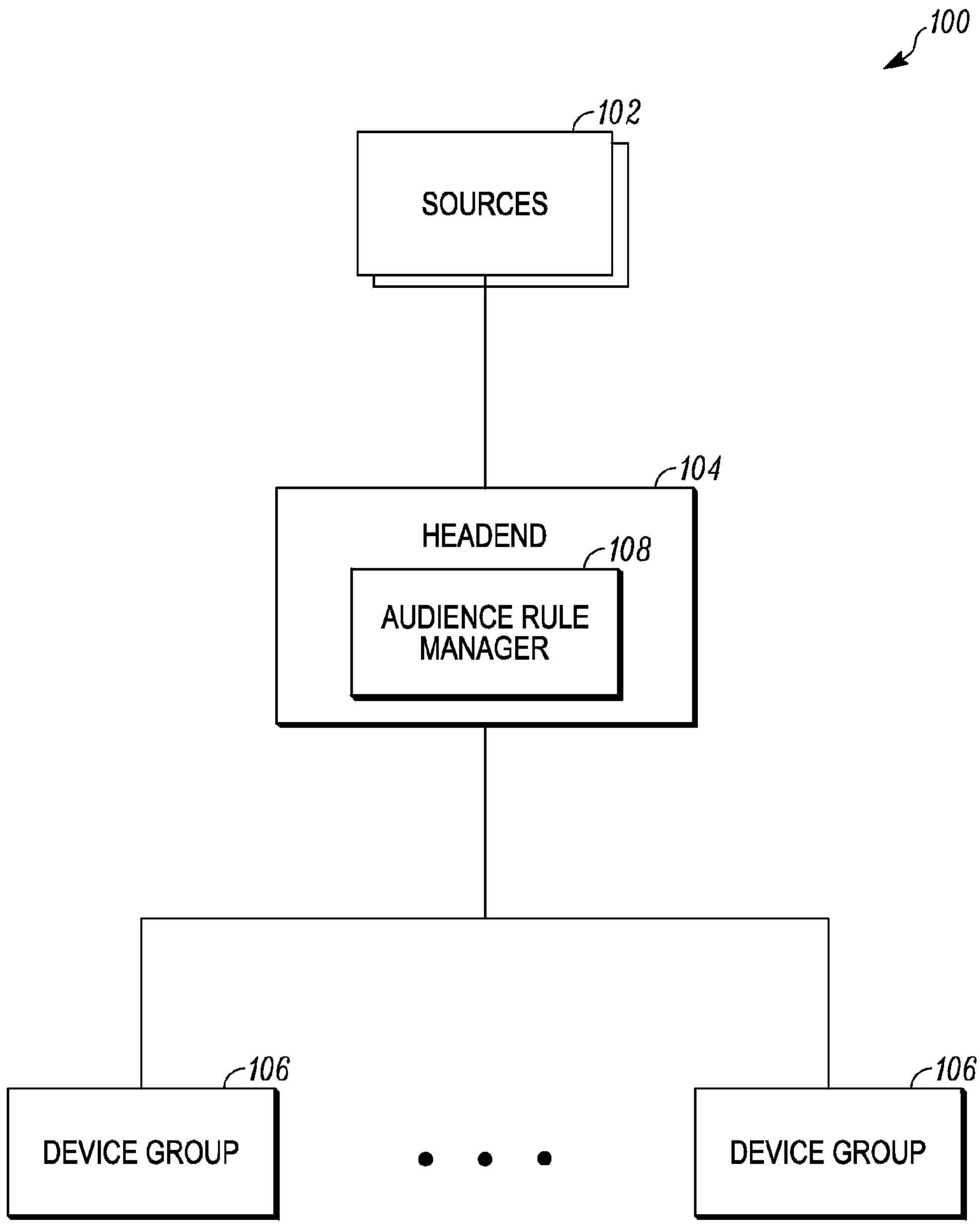
FIG. 1 depicts an example of a system for controlling content authorization according to one embodiment.

FIG. 1 depicts an example of a system 100 for controlling content authorization according to one embodiment. System 100 includes sources 102, a head-end system 104, and device groups 106. An MSO may be associated with head-end system 104, which may provide content to devices in device groups 106. For example, head-end 104 provides video through an over-the-top (OTT) service. The over-the-top service provides services via different delivery mechanisms. For example, traditional service delivery may be through a cable network to a set-top box. The OTT service delivery may deliver content through the Internet, such as through hypertext transfer protocol (HTTP) live streaming (HLS) and video-on-demand (VOD). The OTT service delivery may stream content or may provide a file download with progressive playback.

Device groups 106 may include a variety of heterogeneous devices, such as cellular phones, smartphones, tablet devices, personal computers, and laptop computers, that can play content. In one embodiment, a device group 106 is associated with a discrete entity, such as a household account, which may be a grouping used by the MSO for accounting purposes. Also, the devices in device group 106 may be heterogeneous devices in that they may be associated with different configurations. For example, smartphones include smaller screens than tablet devices. In some cases, a content provider may not want content displayed on smartphones because the content provider may not think the content is properly viewed on the smaller screen. However, the content provider may allow the content to be viewed on tablet devices. Because different households may include different devices, particular embodiments are used to restrict content authorization on other devices in device groups 106.

An audience rule manager 108 allows an MSO to define an audience that is used to restrict content access on devices in device groups 106. The audience may be a definition that is used to specify a segment of a device population. For example, the audience is defined by a combination of device properties, content properties, and digital rights management (DRM) properties.

Audience rule manager 108 applies policy rules to a defined audience. An audience list may be generated that includes multiple audience members and is used to build a policy rule set. Sources 102 may provide information that is used to determine the policy rules. For examples, sources 102 may provide information on device properties, content properties, and also digital rights management (DRM) properties. Also, sources 102 may be the content providers. In this case, the content providers are providing definitions on which audience segment content should be restricted.

In one example, a policy rule that is applied to an audience may state, in plain language, "No HBO™ on Droid™ phones". In this case, audience rule manager 108 determines that a device group X is authorized to receive HBO™. Then, audience rule manager 108 determines that device group X contains a Droid Phone device Y. Additionally, audience rule manager 108 determines that Droid device Y is running both DRM system 1 and DRM system 2. Audience rule manager 108 then deauthorizes device Y for HBO with both the DRM system 1 and DRM system 2.

Policy rules may be supported at a system level that applies to all device groups by default or at a device group level that applies only to a single device group. The device group level policy may supersede any conflicting system level rules. In other examples, the hierarchy of policy rules may be applied differently at the system level and the device group level. An example of the rules hierarchy may be an MSO wishes to up-sell the OTT service by allowing subscribers to purchase the right to play back content on additional devices. For example, a system rule is 5 devices maximum allowed per device group and a device group rule is 10 devices for subscribers who pay $5 per month extra. Also, an MSO or content provider may wish to charge extra for OTT playback of devices that can deliver a better viewing experience. For example, a system rule may be to disallow HBO™ on smart televisions and a device group rule may be to allow HBO™ on smart TVs for subscribers who pay $3 per month extra. Another rule may be an MSO wishes to test a new device type via market trial before supporting it nationally. A system rule may be to disallow HBO™ on tablet devices and a device group rule is to allow HBO™ on tablet devices for subscribers in a trial market of Philadelphia.

Figure 2:
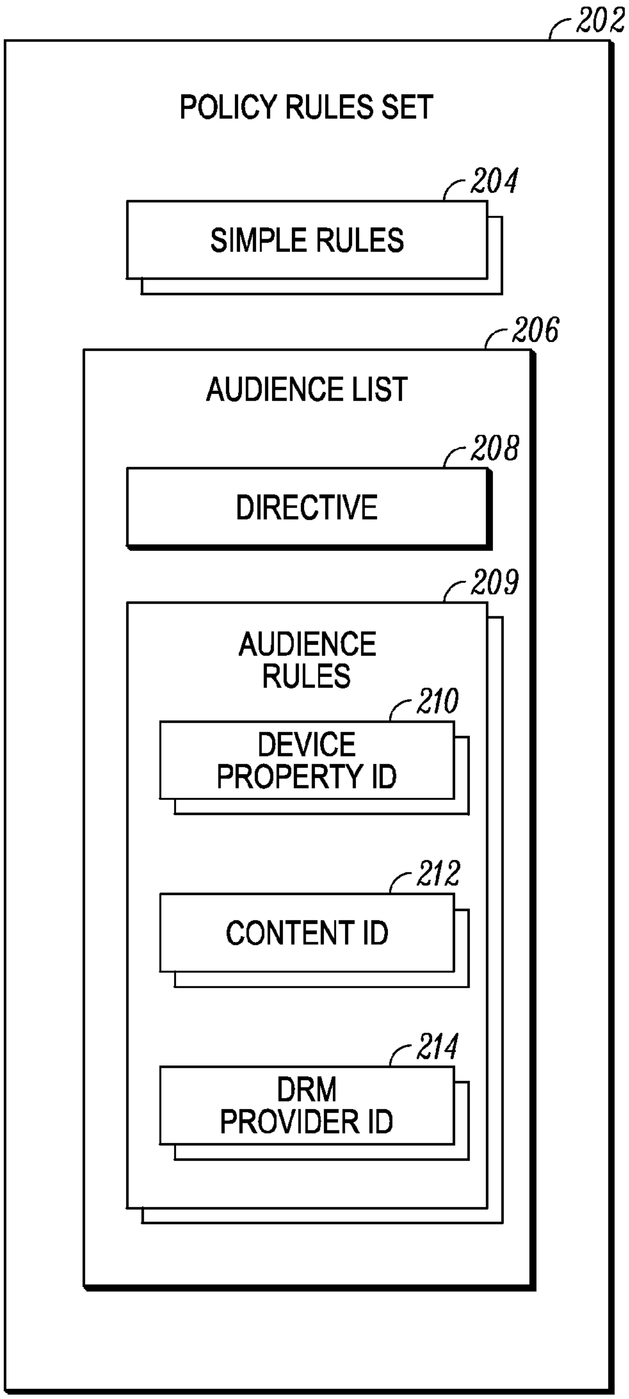
FIG. 2 depicts an example of a policy rule set according to one embodiment.

FIG. 2 depicts an example of a policy rule set 202 according to one embodiment. Policy rule set 202 may include simple rules 204 and an audience list 206. Simple rules 204 may be rules that are not directed to an audience. For example, rules 204 are not dependent on device properties or content authorizations. In one example, a rule may state "a maximum number of devices allowed per device group is 5". Although simple rules are described, simple rules may not be required.

An audience rule 209 describes a subset of a viewing population. For example, the audience may be "Droid™ phones watching HBO™", "Droid3s watching HBO™ or Cinemax", "Droid3s watching anything", "Droid3s using PlayReady DRM", or "HBO™ and Cinemax" on any device". When coupled with a directive 208, a policy rule is formed. For example, the policy rule may be "Disallow HBO™ on Droid phones", Cinemax on Droid3s, and Showtime using PlayReady DRM". Directive 208 may define a restriction, such as disallow or allow, that states the nature of the audience rule.

Audience list 206 includes a set of audience rules 209. Each audience rule 209 includes one or more device property IDs 210, content IDs 212, and/or DRM Provider IDs 214. Each audience list 206 includes one or more audience rules 209 and a directive 208.

An audience rule 209 may define a segment of a device population. For example, the segment is defined by a combination of device property identifiers (IDs) 210, content IDs 212, and DRM provider IDs 214. The IDs may be considered properties for devices, content, or DRM. The device property IDs may refer to a device property defined in the system. For example, the device property may be a make, model, operating system (OS), or other device attribute, e.g., "Motorola", "Droid3™", or "Android™". Devices may be associated with device property IDs at or after the time of definition in system 100.

A content ID refers to content provided by system 100. For example, the content ID may be a service, such as video-on-demand, or another offering managed by system 100. The content ID may also identify content, such as HBO™ or a media program. The content ID may be a service handle, package handle, or asset ID.

A DRM provider ID 214 refers to a DRM provider supported by the system. When a DRM provider is referred to, the DRM provider may be a type of DRM that is used. Also, it will be understood that a company may provide many different types of DRM. DRM provider ID 214 may, but need not be, in a string format (e.g., "SecureMedia™" or "Widevine™"), and correlates to DRM information associated with a device. A DRM provider system on a device is used to restrict content access. For example, content access is restricted by configuring settings in the DRM provider system.

In one embodiment, at least one of a device property ID 210, a content ID 212, or a DRM provider ID 214 is present in an audience rule. When no device property IDs 210 are present, the rule may apply to all device types. Also, when no content IDs 212 are present, a rule may apply to all content authorizations. Further, when no DRM provider ID 214 is present, the rule may apply to all DRM providers. Variations of the above may also be appreciated. Thus, an audience rule may not specify a device property ID 210, a content ID 212, and a DRM provider ID 214, but can be interpreted to apply device property IDs 210, content IDs 212, and DRM provider IDs 214 to the audience rule.

The above data forms an audience rule that can be used to apply to the system level or device level. In one example, an audience rule may state disallow [directive] HBO™ [content ID] and Cinemax™ [content ID] on Droid™ phones [device property ID] running iOS4 [device property ID] with PlayReady™ DRM [DRM provider ID].

In conclusion, a policy rule 202 set may include 0 . . . n simple rules 204. Also, policy rule set 202 includes 0 . . . 1 audience lists 206. Audience list 206 may list 1 . . . n audience rules 209. In one embodiment, exactly one directive 208 is associated with an audience list 206. Directive 208 is applied to all audience rules 209 in audience list 206. 0 . . . n device property IDs, content IDs, and DRM provider IDs may be associated with audience rule 209.

FIG. 3 depicts an example of software code for a policy rules set according to one embodiment. Although extensible markup language (XML) is used, other languages may be provided. At 302, a policy rules set is defined. At 304, a simple rule 204 is defined. Simple rule 204 may be "a maximum number of devices in a device group is 5". At 306, an audience list 206 is defined. Audience list 206 includes directive 208 of "disallow" that is shown at 308.

Multiple audience rules 209 are then listed for audience list 206. Each audience rule 209 may be based on a combination of device property IDs 210, content IDs 212, and DRM provider IDs 214. For example, an audience rule 209-1 includes a device property ID 210 of "300" and a content ID of "LINEARAuth handle=100000" type="package". This may identify a device type and content type. The audience may also apply to all DRM systems because a DRM system is not included. Additionally, an audience rule 209-2 includes a device property ID 210 of "500" and a DRM provider ID 214 of "DRMProviderRef id=PlayReady". This may identify a device type and DRM system. The audience may also apply to all content because a content ID is not included.

Policy rules may be set up on the device group level and system level. The policy rules set may be associated with a system, a device group, or both. Rules in a device group may override rules at the system level if rules conflict.

Figure 4:
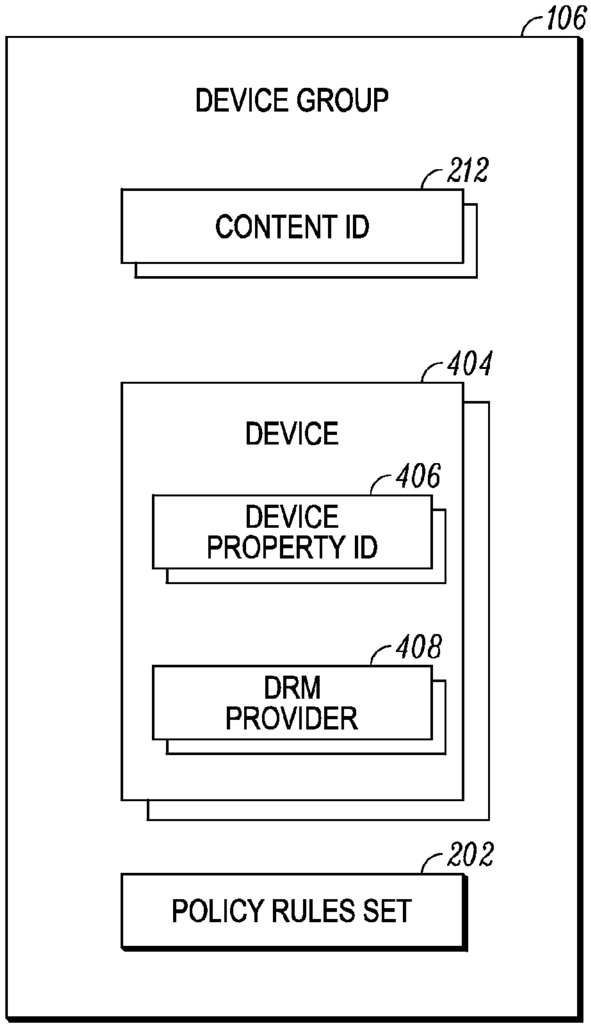
FIG. 4 depicts an example of policy rules on the device group level according to one embodiment.

FIG. 4 depicts an example of policy rules on the device group level according to one embodiment. The policy rules may only apply to devices and content authorizations associated with a device group 106. For example, the devices are the registered devices in a single device group 106, such as a household. The content authorizations are which content a device group 106, such as a household, is authorized to view. For example, a household may subscribe to HBO™.

Device group 106 includes content ID 212, which represents an authorization for content, such as a service, package, VOD asset, or other offering for the household. 0 . . . n content IDs 212 may be associated with device group 106. A device 404 represents a device that can receive content. For example, device 404 may be a customer premise equipment (CPE) device. 0 . . . n devices 404 may be associated with device group 106.

A device property ID 406 within each device 404 describes the device type. These are devices associated with a household. Device property ID 406 may refer to a type defined in system 100, which may be a make, model, OS, or other attribute. 0 . . . n device property IDs 406 may be associated with device 404.

A DRM provider 408 contains data necessary to administer device 404 with its supported DRM systems. For example, a given device 404 may support both SecureMedia and Widevine DRM. In this case, two DRM providers 408 are associated with device 404. DRM provider data may include a unique device ID, key information, activation information, registration data, or other data. 1 . . . n DRM providers 408 may be associated with device 404.

Policy rules set 202 may be associated with device group 106. These are the different policy rules that apply to a specific device group 106.

Figure 5:
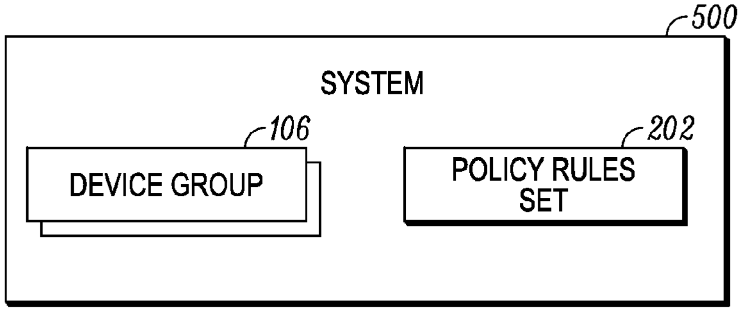
FIG. 5 depicts an example of a system-level policy rules set according to one embodiment.

FIG. 5 depicts an example of a system-level policy rules set according to one embodiment. Rules in the system-level context may be superseded by rules in the device-group context when there is a conflict. In the system level, policy rules may be applied to all devices and content authorizations in system 100 by default. In one embodiment, a system is an application server whose scope is limited only by the functional capabilities of its hardware and software. For example, a system may support up to 10 million device groups 106 and an MSO may have 5 systems to serve a region. In one embodiment, exactly one policy rules set is associated with a system.

In system 500, device group 106 is a set of content authorizations, devices, policy rules, and supporting data required for the MSO to manage an account. For example, device group 106 may be, but not necessarily, associated with a subscriber or household. System 500 may contain 0 . . . n device groups 106.

Policy Rules Definition

Figure 6:
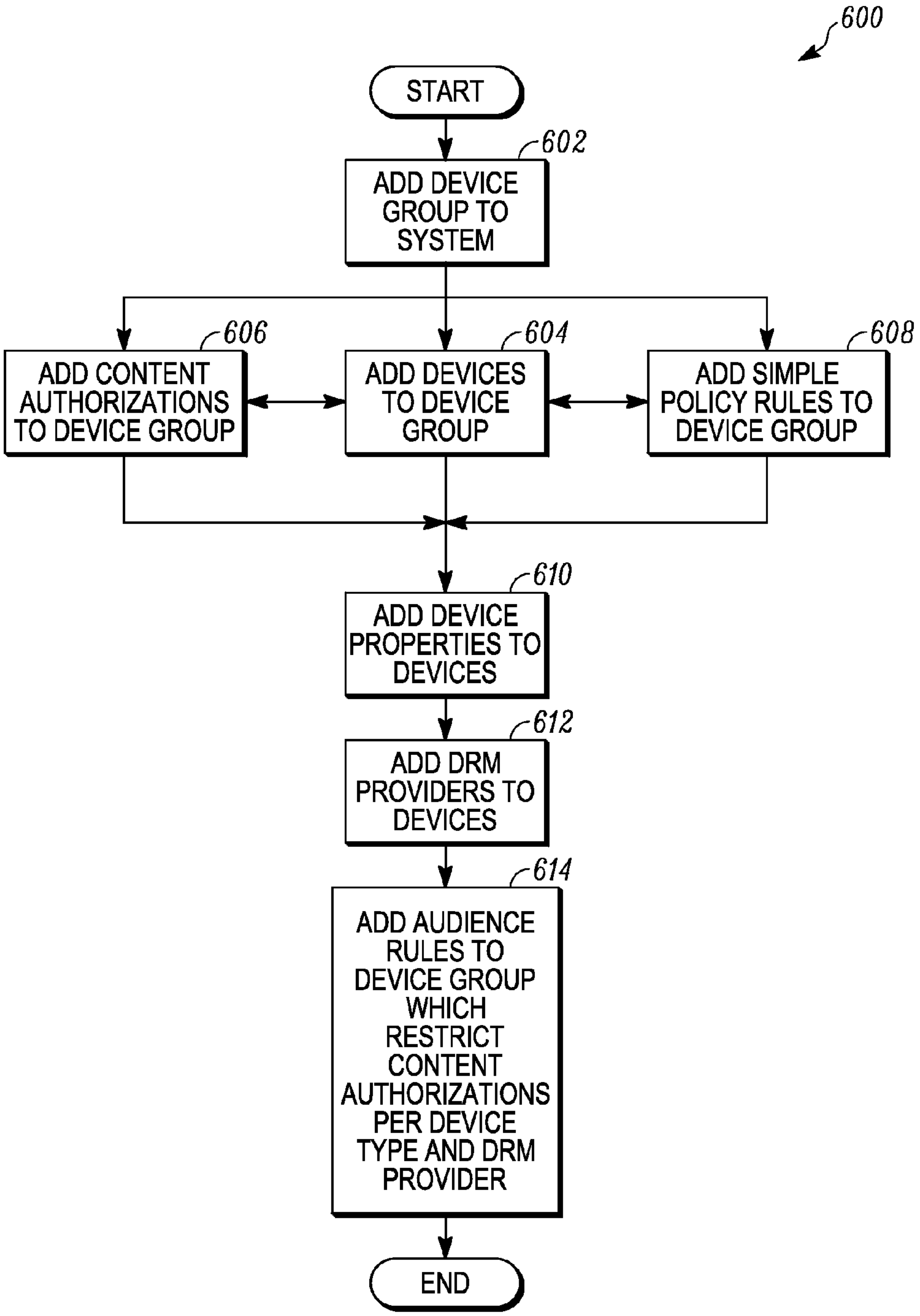
FIG. 6 depicts a simplified flowchart of a method for defining policy rules at a device group level according to one embodiment.

Policy rules may be first defined and then enforced. The policy rule definition process will first be described. FIG. 6 depicts a simplified flowchart 600 of a method for defining policy rules at a device group level according to one embodiment.

At 602, audience rule manager 108 adds a device group 106 to system 100. Device group 106 may be a household. For example, a household may initiate an account with the MSO.

At 604, devices are added to device group 106. For example, the devices associated with the household may be added to device group 106. In one example, a household may include two different types of smartphones, a tablet computer, and a laptop computer. At 606, audience rule manager 108 adds content authorizations to device group 106. The content authorizations may be which content the household is authorized to receive. For example, the household may subscribe to HBO™. At 608, audience rule manager 108 adds simple policy rules 204 to device group 106. For example, simple policy rules 204 are not dependent on an audience, such as device properties, DRM providers, or the content authorizations.

At 610, audience rule manager 108 adds device properties to the devices. For example, the device properties may include device property IDs 406. This defines the device type for the devices of the household.

At 612, audience rule manager 108 adds DRM providers 408 to devices 404. For example, the DRM provider structures that are used by the devices of the household are added. At 614, audience rule manager 108 then adds audience rules to device group 106 that restrict content authorizations per device type and DRM provider.

Figure 7:
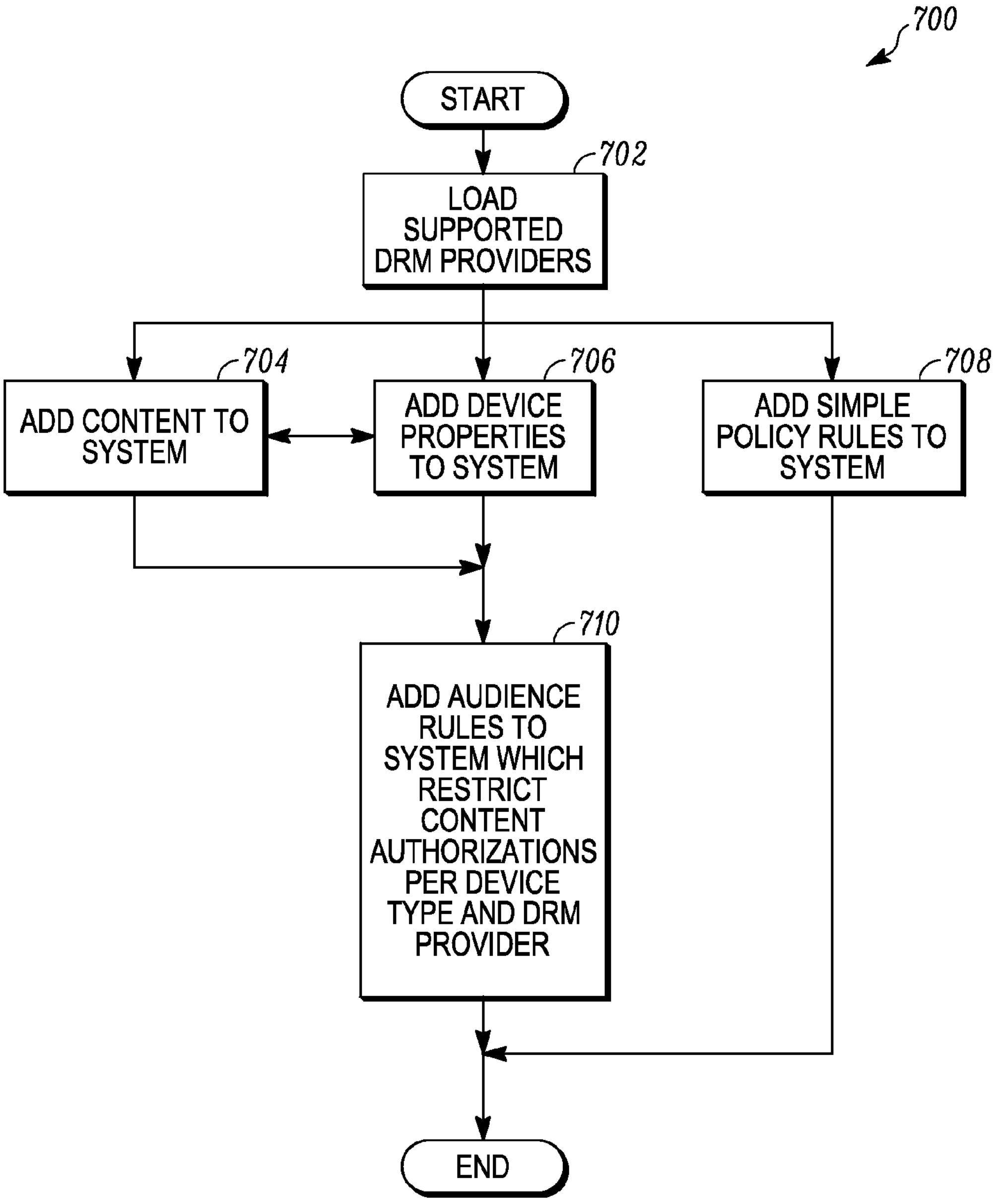
FIG. 7 depicts a simplified flowchart for policy rules definition at a system level according to one embodiment.

FIG. 7 depicts a simplified flowchart 700 for policy rules definition at a system level according to one embodiment. At 702, audience rule manager 108 loads supported DRM providers. These are the DRM providers that are supported by system 100.

At 704, audience rule manager 108 adds content to system 100. For example, this is the content that is provided by the MSO using OTT services.

At 706, audience rule manager 108 adds device properties to system 100. For example, the device properties may be device property IDs 406 that are supported by system 100. At 708, audience rule manager 108 adds simple policy rules to system 100. These are policy rules that apply at the system level. At 710, audience rule manager 108 adds audience rules to system 100 that restrict content authorization per device type and DRM provider at the system level.

Policy Rules Enforcement

Figure 8:
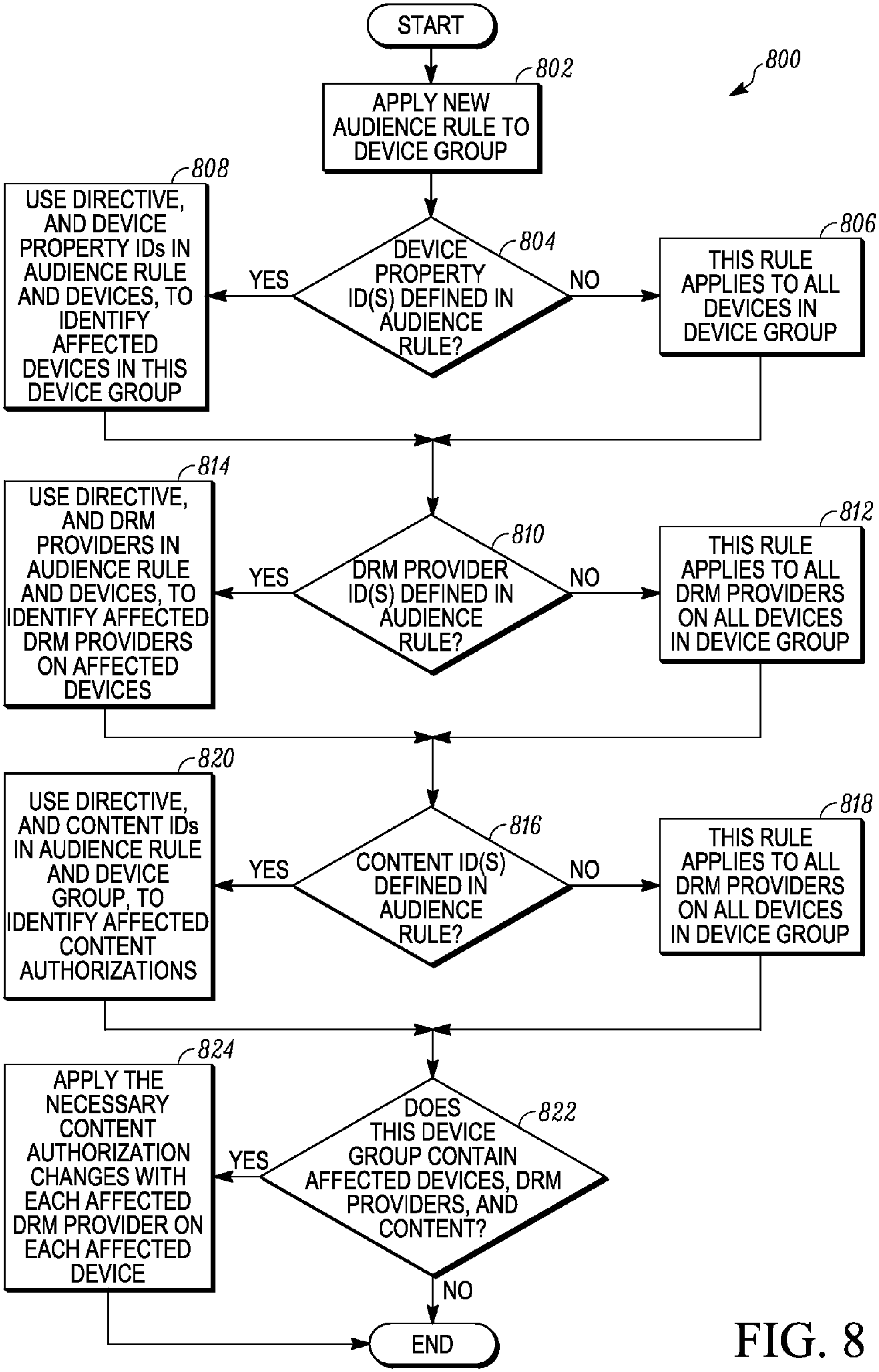
FIG. 8 depicts a simplified flowchart of a method for enforcing policy rules at the device group level when a new audience rule is added according to one embodiment.

Policy rules may be enforced at the device level and the system level. FIG. 8 depicts a simplified flowchart 800 of a method for enforcing policy rules at the device group level when a new audience rule is added according to one embodiment. At 802, audience rule manager 108 applies a new audience rule to device group 106. The new audience rule may be "No HBO on Droid phones" for a household. At 804, audience rule manager 108 determines if device property IDs 210 are defined in the audience rule. If device property IDs 210 are not defined, at 806, this audience rule applies to all devices in device group 106. If device property IDs 210 are defined in the audience rule, at 808, audience rule manager 108 uses directive 208 and device property IDs 210 in the audience rule, and the devices in device group 106 to identify the affected devices in device group 106. For example, audience rule manager 108 determines devices of a certain device type used by the household.

At 810, audience rule manager 108 determines if DRM provider IDs 214 are defined in the audience rule. If no DRM provider IDs 214 are defined, this audience rule applies to all DRM providers on all devices in device group 106. If DRM provider IDs 214 are defined, then at 814, audience rule manager 108 uses directive 208 and DRM providers IDs 214 in the audience rule, and devices in device group 106 to identify on the affected devices. For example, if a device include any DRM providers that are associated with the DRM provider IDs, this device is affected.

At 816, audience rule manager 108 determines if content IDs 212 are defined in the audience rule. If content IDs 212 are not defined, then at 818, audience rule manager 108 determines this rule applies to all content authorizations in device group 106.

If content IDs 212 are defined, at 820, audience rule manager 108 uses directive 208 and content IDs 212 in the audience rule and device group 106 to identify affected content authorizations. For example, the content that is authorized for device group 106 is compared to determine if the content authorized is associated with any content IDs 212 in the audience rule.

At 822, audience rule manager 108 determines if this device group 106 contains affected devices, DRM providers, and content. If not, the process ends. If so, at 824, audience rule manager 108 applies the necessary content authorization changes with each DRM provider on each affected device. For example, audience rule manager 108 may deauthorize some devices in device group 106 to receive content. In one example, a household may subscribe to HBO. However, a content provider may not want the household to view HBO on mobile devices. Thus, a mobile device is deauthorized from viewing HBO in the household.

Figures 9, 9A, 9B:
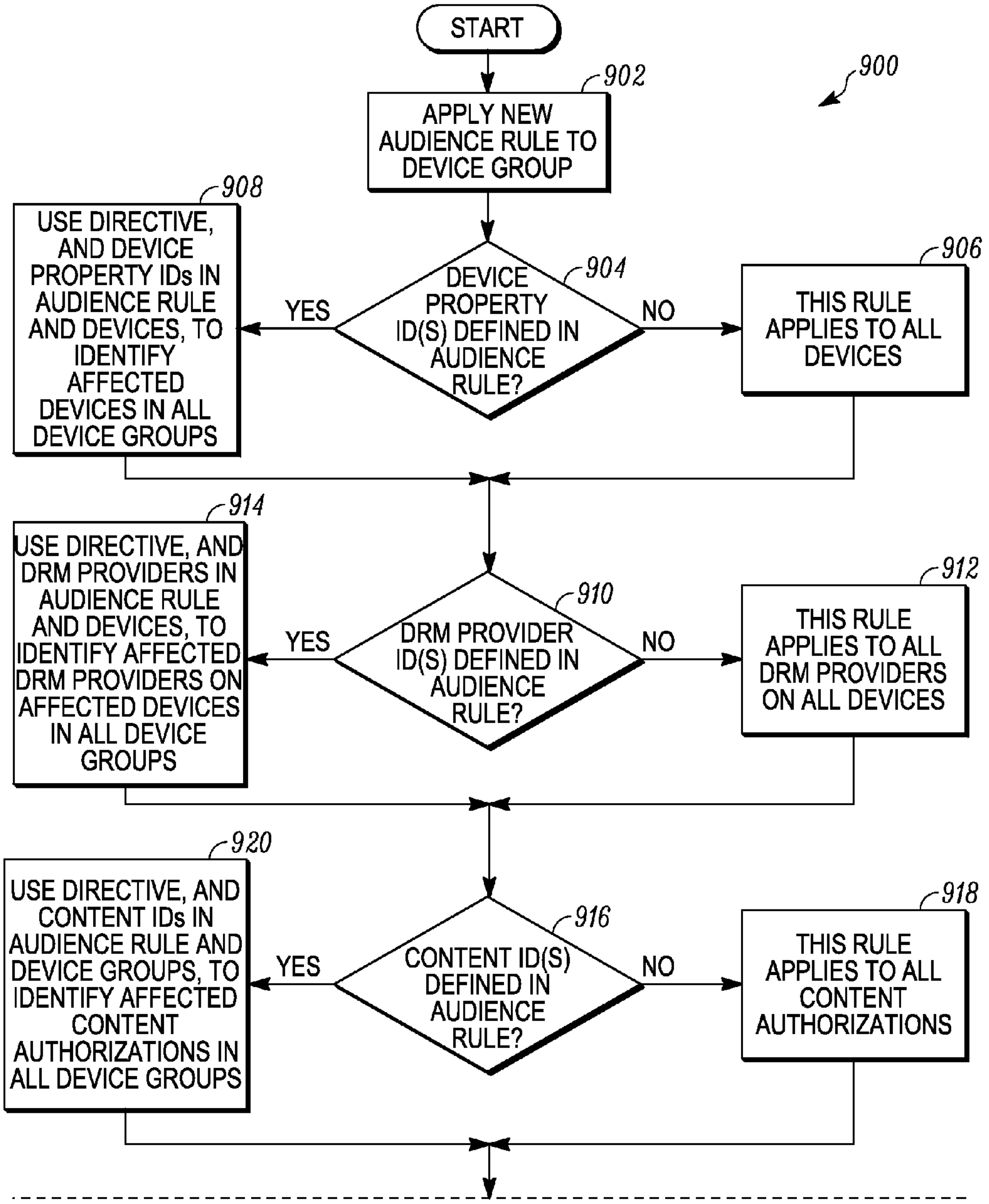
FIG. 9 depicts a simplified flowchart of a method for enforcing rules at a system level according to one embodiment.
Figure 9B:
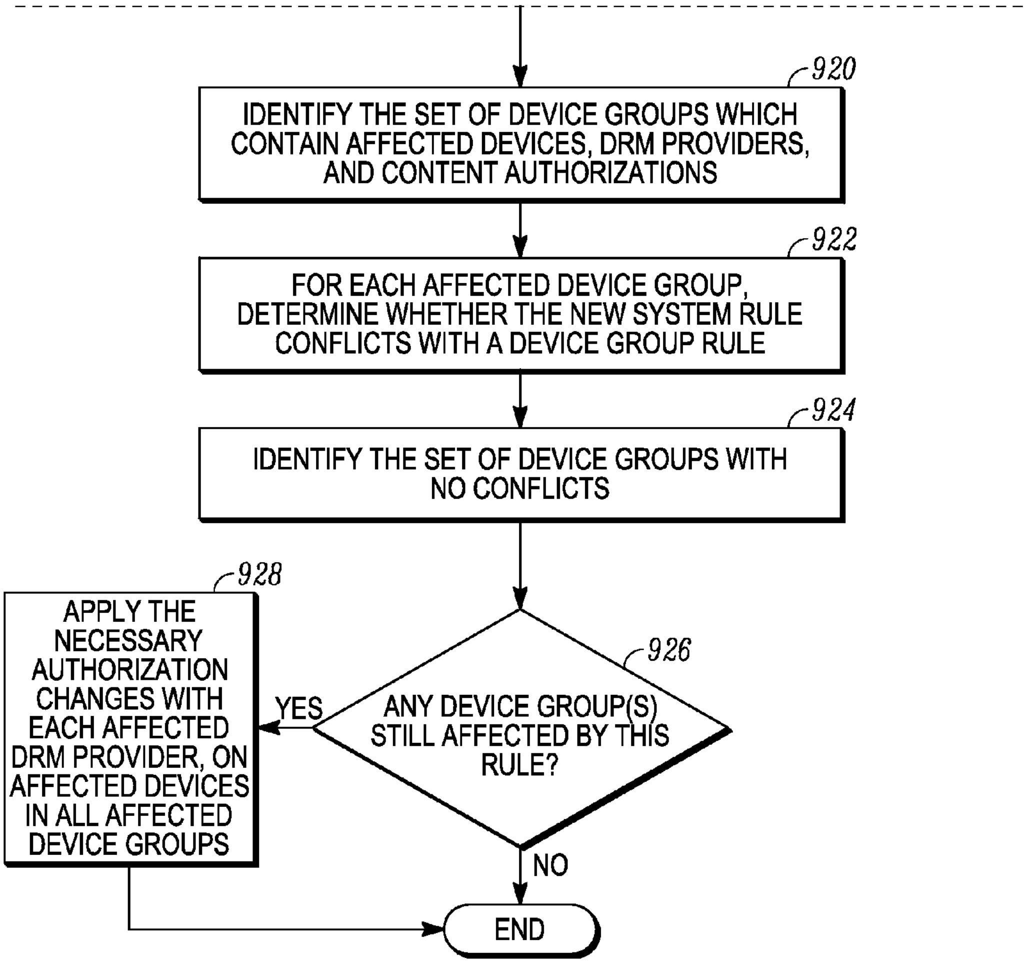

FIG. 9 (shown FIGS. 9A and 9B) depicts a simplified flowchart 900 of a method for enforcing rules at a system level according to one embodiment. At 902, audience rule manager 108 applies a new audience rule at the system level in system 100. At 904, audience rule manager 108 determines if device property IDs 210 are defined in the audience rule. At 906, if device property IDs 210 are not defined, the rule applies to all devices in all device groups 106. At 908, if device property IDs 210 are defined, audience rule manager 108 uses the directive and device property IDs in the audience rule, and devices to identify affected devices in all device groups 106.

At 910, audience rule manager 108 determines if any DRM provider IDs 214 are defined in the audience rule. If no DRM provider IDs 214 are defined, at 912, this audience rule applies to all DRM providers on all devices in system 100. At 914, if DRM provider IDs 214 are defined, audience rule manager 108 uses the directive and DRM providers in the audience rule and all devices to identify DRM providers on affected devices in all device groups 106. This determines devices that may include the DRM providers defined.

At 916, audience rule manager 108 determines if any content IDs 212 are defined in the audience rule. If no content IDs 212 are defined, at 918, this audience rule applies to all content authorizations. At 920, if content IDs 212 are defined, audience rule manager 108 uses the directive and content IDs in the audience rule and device groups 106 to identify affected content authorizations in all device groups 106.

At 920, audience rule manager 108 identifies the set of device groups 106 that contain affected devices, DRM providers, and content authorizations. At 922, for each affected device group 106, audience rule manager 108 determines if the new audience rule conflicts with a device-group rule. For example, the device-group rules may override the system-level rules. At 924, audience rule manager 108 identifies the set of device groups 106 with no conflicts. At 926, audience rule manager 108 determines any device groups 106 still affected by this rule. If there are none, the process ends. If some device groups 106 are affected, at 928, audience rule manager 108 applies the necessary content authorization changes with each affected DRM provider on the affected devices in all affected device groups 106.

Figures 10, 10A:
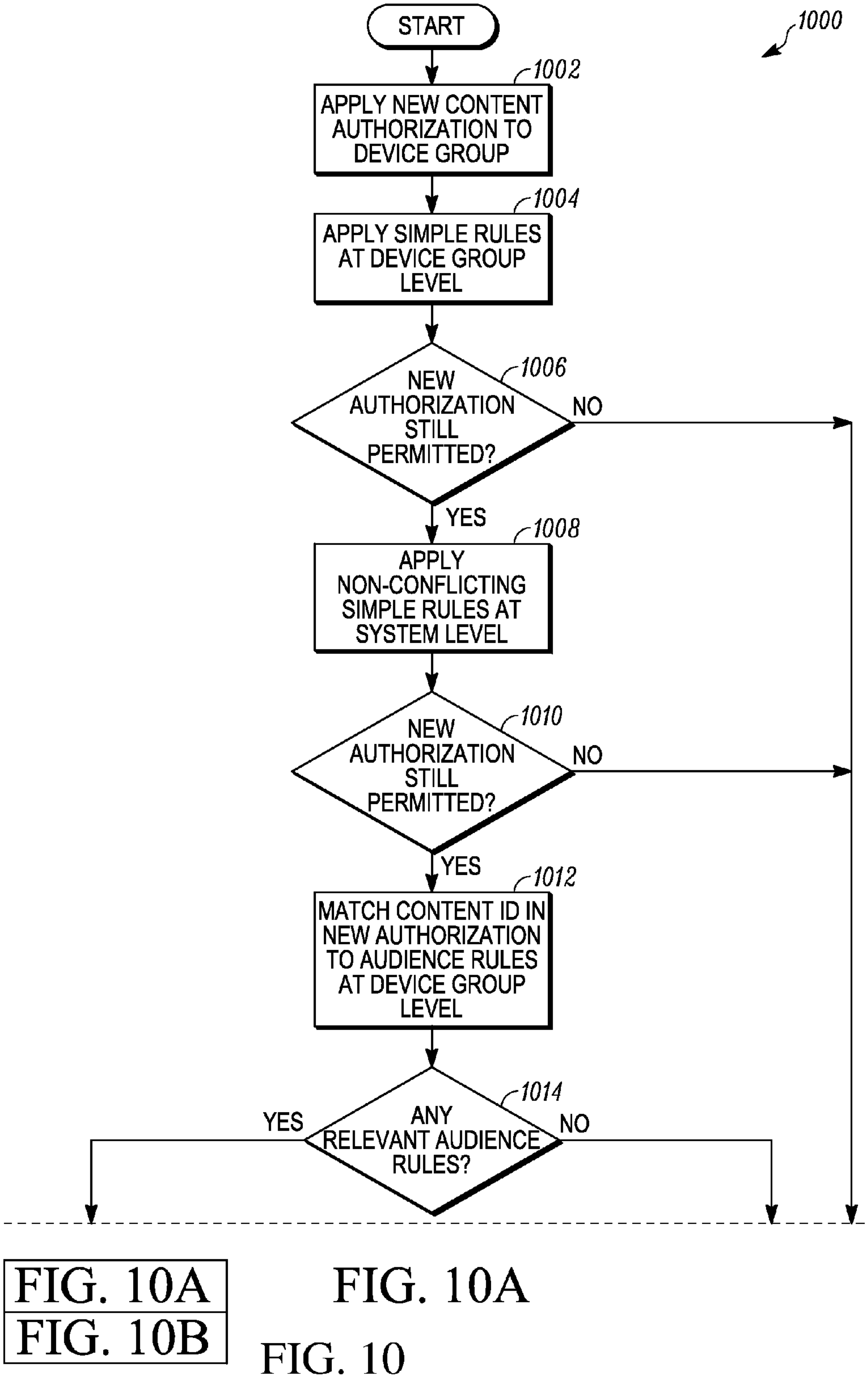
FIG. 10 depicts a simplified flowchart of a method for enforcing policy rules when an authorization for content is provided to a device group 106 according to one embodiment.
Figure 10B:
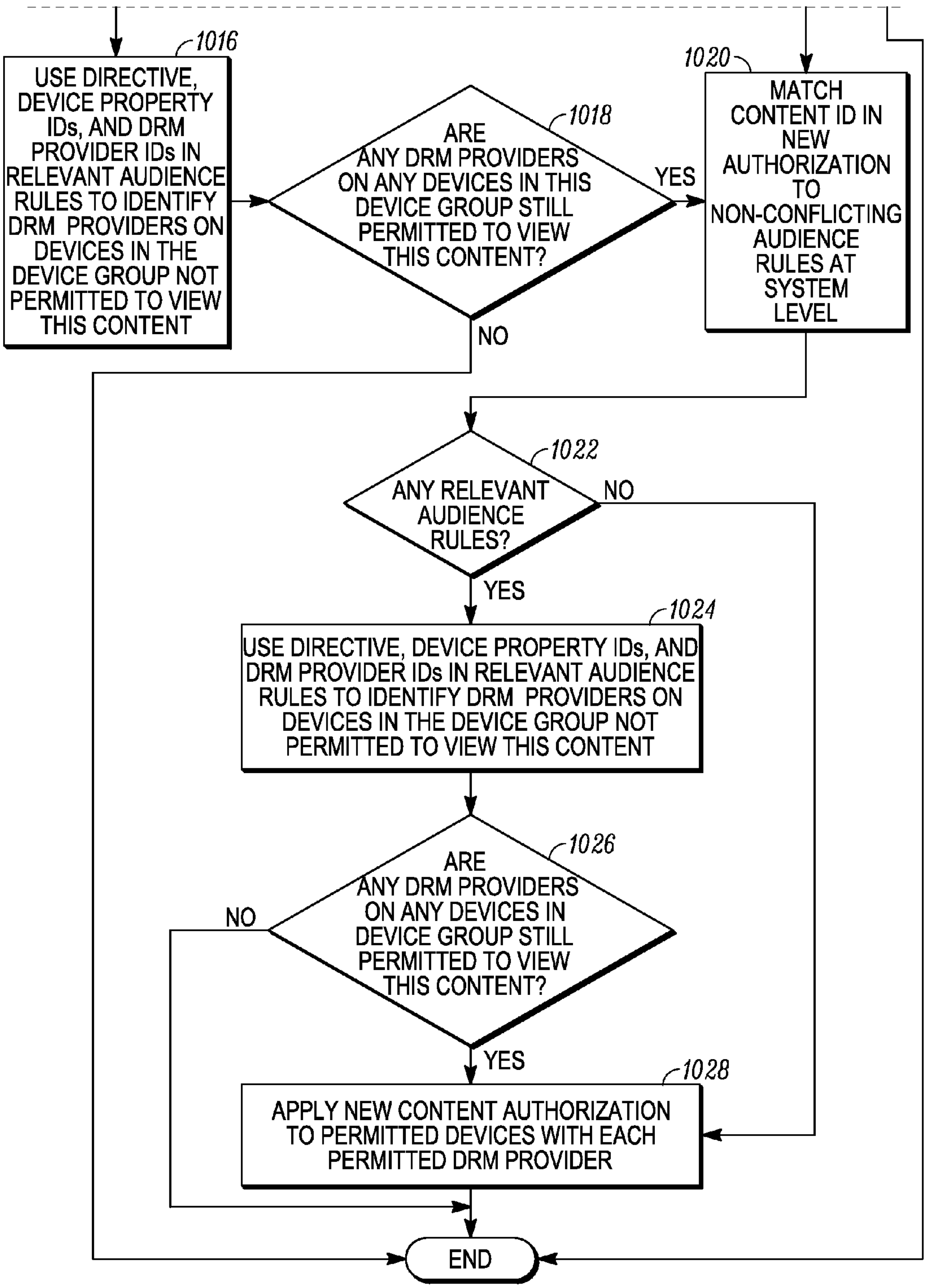

In addition to adding new audience rules, the policy rules may be enforced when new content is applied or when a device is added to a device group 106. FIG. 10 (shown as FIGS. 10A and 10B) depicts a simplified flowchart 1000 of a method for enforcing policy rules when an authorization for content is provided to a device group 106 according to one embodiment. At 1002, audience rule manager 108 applies a new content authorization to device group 106. For example, a household may order a new subscription to Cinemax.

At 1004, audience rule manager 108 applies simple rules at the device group level. For example, the simple rules may determine if devices in device group 106 are authorized to consume the content. For example, a simple rule may be "no more than 100 service authorizations permitted for this device group". If this new content authorization is a linear service (e.g. HBO), and the device group is already authorized for 100 services, the content authorization would be discarded. At 1006, audience rule manager 108 determines if the new authorization is still permitted. If not, the process ends. If the new authorization is still permitted, at 1008, audience rule manager 108 applies non-conflicting simple rules at the system level. For example, a system-level rule states "no more than 50 VOD asset authorizations permitted". This rule does not conflict with the prior device group rule (100 services allowed), and it is applied here. Then, because this use case is a service authorization, and not a VOD authorization, the rule does not restrict the content. At 1010, audience rule manager 108 determines if a new authorization is still permitted. If the new authorization is not permitted, the process ends. If the new authorization is still permitted, at 1012, audience rule manager 108 matches a content ID in the new authorization to audience rules at the device group level. For example, audience rule manager 108 determines if any audience rules at the device group level are associated with the content ID. At 1014, audience rule manager 108 determines if there are any relevant audience rules. If so, at 1016, audience rule manager 108 uses directive 208, device property IDs 210, content IDs 212, and DRM provider IDs 214 in the relevant audience rules to identify DRM providers on devices in device group 106 that are not permitted to view this content. This may determine that a smartphone may not be able to view this content. At 1018, audience rule manager 108 determines if there are any DRM providers on any devices in this device group 106 still permitted to view the content. If not, the process ends.

If there are devices permitted, at 1020, audience rule manager 108 matches the content ID in the new content authorization to non-conflicting audience rules at the system level. Since there are devices in device group 106 that are authorized to view the new authorized content, the system level is checked next to see if the content is restricted by a system level rule.

At 1022, audience rule manager 108 determines any relevant audience rules at the system level. If there are relevant rules, at 1024, audience rule manager 108 uses the directive 208, device property IDs 210, and DRM provider IDs 214 in the relevant audience rules to identify DRM providers in device group 106 that are not permitted to view this content. At 1026, audience rule manager 108 determines if there are any DRM providers on any devices in device group 106 still permitted to view the content. If not, the process ends. If so, at 1028, audience rule manager 108 applies the new content authorizations to the permitted devices with each permitted DRM provider. Accordingly, the process determined for the new content authorization if any devices in device group 106 are permitted to view the new content and adjusted the content authorization to allow these new devices to consume the new content.

Figure 11A:
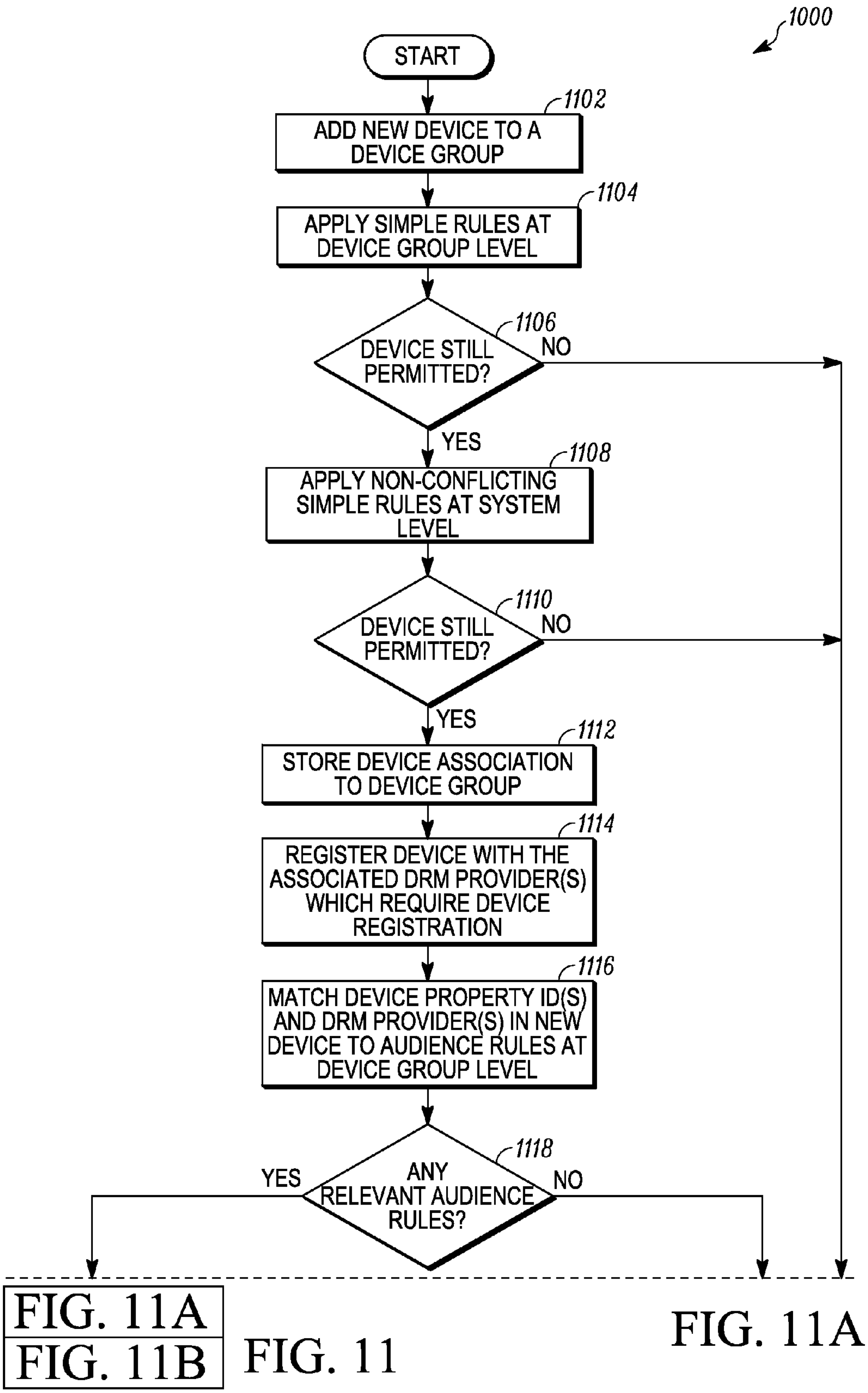
FIG. 11 depicts a simplified flowchart of a method for policy rules enforcement when a device is added to a device group according to one embodiment.
Figure 11B:
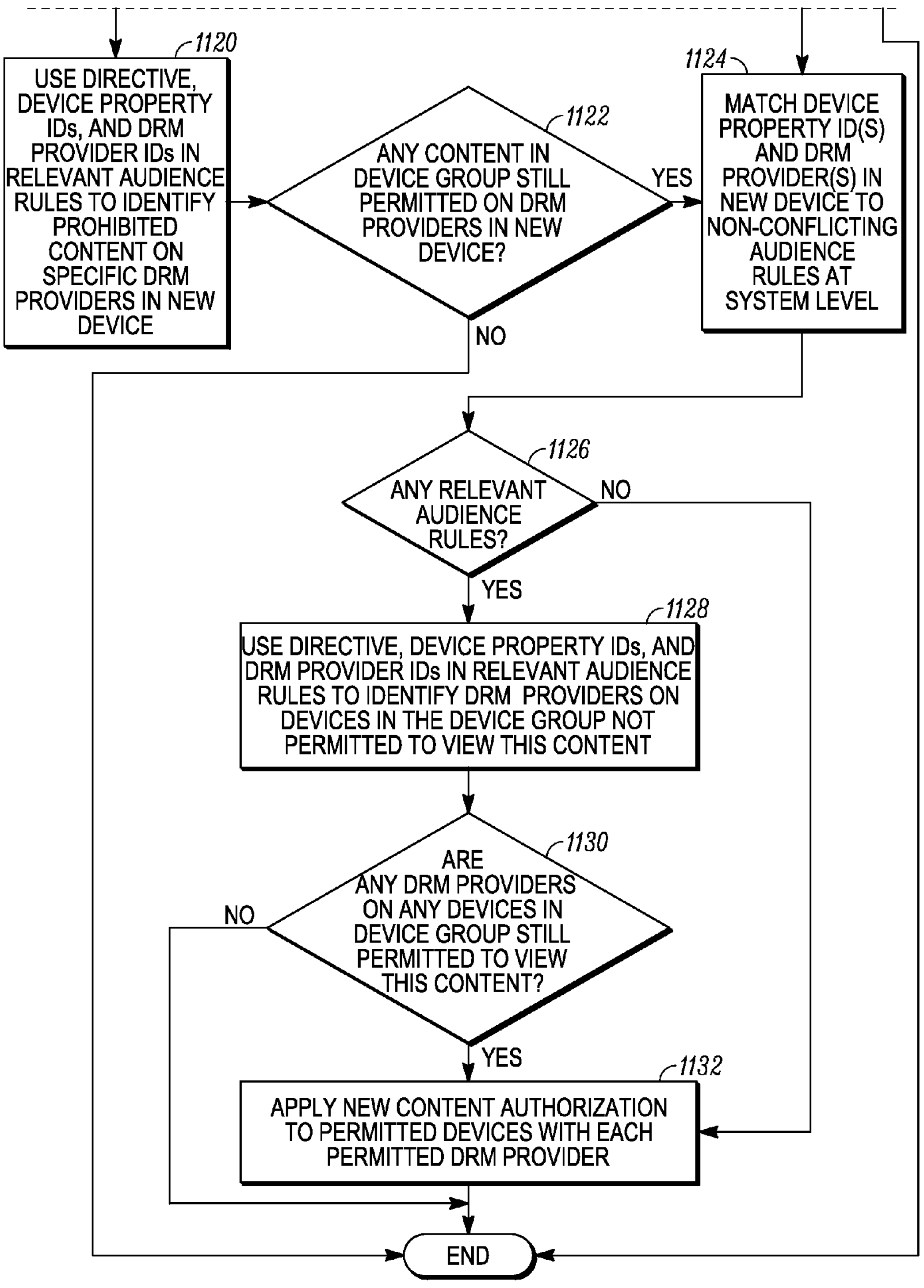

FIG. 11 (shown as FIGS. 11A and 11B) depicts a simplified flowchart 1100 of a method for policy rules enforcement when a device is added to device group 106 according to one embodiment. At 1102, audience rule manager 108 adds a new device to device group 106. For example, a subscriber may purchase a new Droid phone and add the new Droid phone to device group 106. The process then determines which content authorizations this new device should be authorized for. At 1104, audience rule manager 108 applies simple rules at the device group level. At 1106, audience rule manager 108 determines if the device is still permitted. If not, the process ends. For example, the new device may not be authorized for any content. If the device is still permitted, at 1108, audience rule manager 108 applies non-conflicting simple rules at the system level. At 1110, audience rule manager 108 determines if the device is still permitted. If not, the process ends and no new content authorizations are provided.

At 1112, audience rule manager 108 stores a device association to device group 106. At 1114, audience rule manager 108 registers the device with the associated DRM providers that require device registration. At 1116, audience rule manager 108 matches device property IDs 210 and DRM provider IDs 214 in the new device to audience rules at the device group level. At 1118, audience rule manager 108 determines if there are any relevant audience rules. If so, at 1120, audience rule manager 108 uses the directive, device property IDs 210, and DRM provider IDs 214 in relevant audience rules to identify prohibited content on specific DRM providers in the new device.

At 1122, audience rule manager 108 determines if any content in device group 106 is still permitted on DRM providers in the new device. If not, the process ends. If so, (this step is also performed if there were not any relevant audience rules at 1118), at 1124, audience rule manager 108 matches device property IDs 210 and DRM provider IDs 214 in the new device to non-conflicting audience rules at the system level. At 1126, audience rule manager 108 determines if there are any relevant audience rules at the system level. If so, at 1128, audience rule manager 108 uses directive 208, device property IDs 210 and DRM provider IDs 214 and relevant audience rules to identify prohibited content on specific DRM providers in the new device. At 1130, audience rule manager 108 determines if any content is still permitted on DRM providers in the new device. If so, (this step is also performed if there are no relevant audience rules at 1126), at 1132, audience rule manager 108 authorizes the device for the permitted content with each permitted DRM provider.

Accordingly, the audience definitions and audience list definitions are used to enforce policy rules that limit content in viewership based on content offering, device type, or content offering plus device type. The method of applying simple rules and audience rules may apply to either the system or device group rules.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:

determining an audience rule to be applied for delivering content, wherein the audience rule specifies an audience that is defined based on a combination of device properties, content properties, and digital rights management (DRM) properties;

determining a device group associated with a group of devices, wherein devices in the device group are associated with content authorization properties, device properties, and digital rights management (DRM) properties; and applying, by a computing device, the audience rule to the device group to determine any devices in the group of devices in which a content authorization for a device should be altered based on analyzing the content authorization properties, device properties, and digital rights management (DRM) properties of the device group and the combination of device properties, content properties, and digital rights management (DRM) properties of the audience rule, wherein the altering determination for a device is determined when the group of devices is changed so that they have content associated with a different DRM property, content authorization properties, or device properties, wherein the altering determination is made after the DRM properties are initially established when the DRM properties are later modified, and are further made prior to receipt of a request for play of content by a device in the group of devices; and wherein determining if affected content authorizations should be altered in the affected device groups comprises:

determining if the audience rule added at the system level conflicts with any audience rules at a device group level for the affected device group; and not altering content authorizations for any affected device groups if the audience rule at the system level conflicts with any audience rules at the device group level.

2. The method of claim 1, wherein applying the audience rule comprises altering the content authorization, or de-authorizing a current content authorization for the device.

3. The method of claim 1, wherein applying the audience rule comprises changing the DRM properties on the device to alter the content authorization.

4. A non-transitory computer-readable storage medium containing instructions, that when executed, control a computer system to be configured for:

determining an audience rule to be applied for delivering content, wherein the audience rule specifies an audience that is defined based on a combination of device properties, content properties, and digital rights management (DRM) properties;

determining a device group associated with a group of devices, wherein devices in the device group are associated with content authorization properties, device properties, and digital rights management (DRM) properties; and applying the audience rule to the device group to determine any devices in the group of devices in which a content authorization for a device should be altered based on analyzing the content authorization properties, device properties, and digital rights management (DRM) properties of the device group and the combination of device properties, content properties, and digital rights management (DRM) properties of the audience rule, wherein the altering determination for a device is determined when the group of devices is changed so that they have content associated with a different DRM properties, content authorization properties, or device properties, wherein the altering determination is made after the DRM properties are initially established when the DRM properties are later modified, and are further made prior to receipt of a request for play by a device in the group of devices;

wherein determining if affected content authorizations should be altered in the affected device groups comprises:

determining if the audience rule added at the system level conflicts with any audience rules at a device group level for the affected device group; and not altering content authorizations for any affected device groups if the audience rule at the system level conflicts with any audience rules at the device group level.

5. The non-transitory computer-readable storage medium of claim 4, wherein applying the audience rule comprises altering the content authorization, or de-authorizing a current content authorization for the device.

6. The non-transitory computer-readable storage medium of claim 4, wherein applying the audience rule comprises changing the DRM properties on the device to alter the content authorization.

7. An apparatus comprising:

one or more computer processors; and a computer-readable storage medium comprising instructions, that when executed, control the one or more computer processors to be configured to:

determining an audience rule to be applied for delivering content, wherein the audience rule specifies an audience that is defined based on a combination of device properties, content properties, and digital rights management (DRM) properties;

determining a device group associated with a group of devices, wherein devices in the device group are associated with content authorization properties, device properties, and digital rights management (DRM) properties; and applying the audience rule to the device group to determine any devices in the group of devices in which a content authorization for a device should be altered based on analyzing the content authorization properties, device properties, and digital rights management (DRM) properties of the device group and the combination of device properties, content properties, and digital rights management (DRM) properties of the audience rule, wherein the altering determination for a device is determined when the group of device is changed so that they have content associated with a different DRM properties, content authorization properties, or device properties, wherein the altering determination is made after the DRM properties are initially established when the DRM properties are later modified, and are further made prior to receipt of a request for play by a device in the group of devices;

wherein determining if affected content authorizations should be altered in the affected device groups comprises:

determining if the audience rule added at the system level conflicts with any audience rules at a device group level for the affected device group; and not altering content authorizations for any affected device groups if the audience rule at the system level conflicts with any audience rules at the device group level.

* * * * *